Sept. 30, 1958  E. SCHULTHESS  2,854,030
OIL HOSE
Filed Sept. 13, 1956
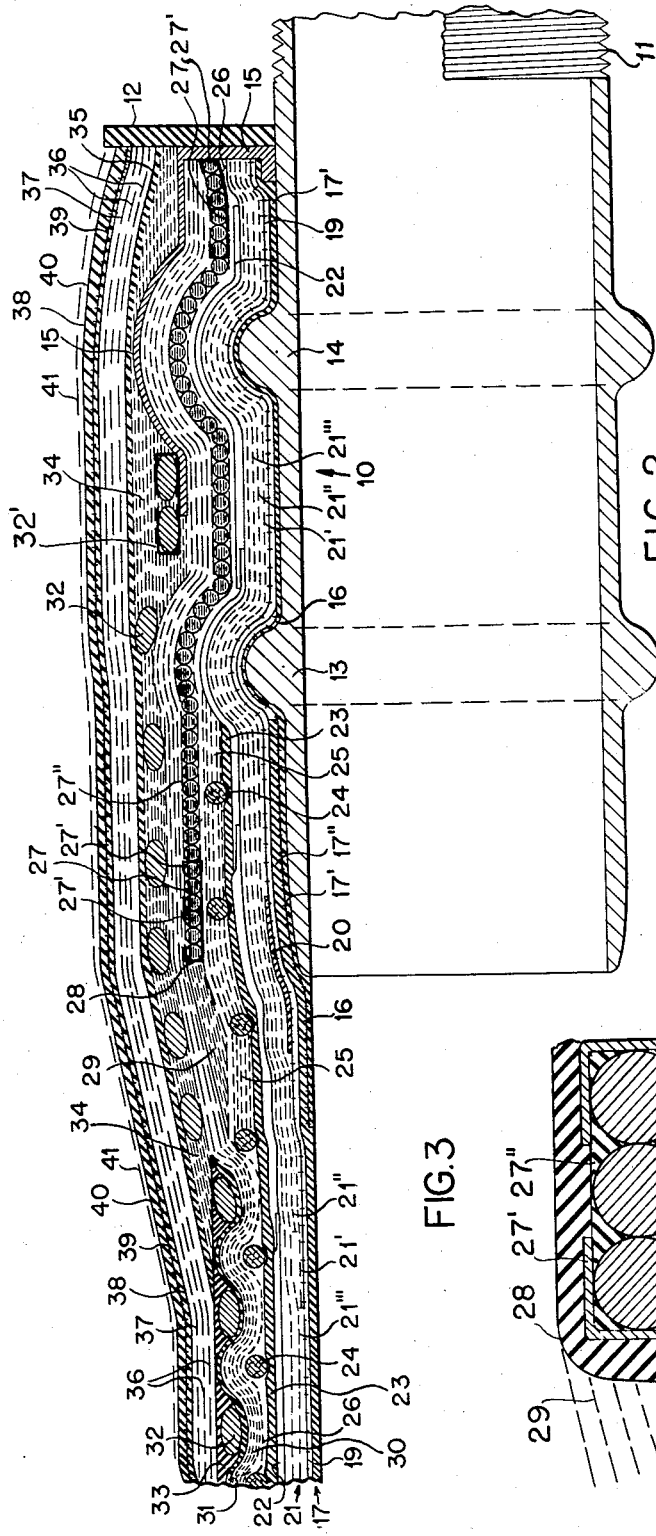
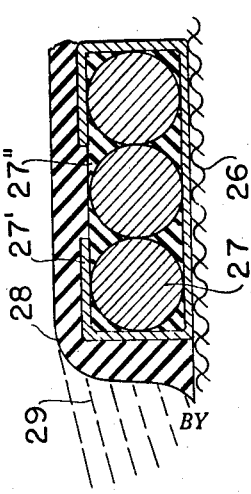
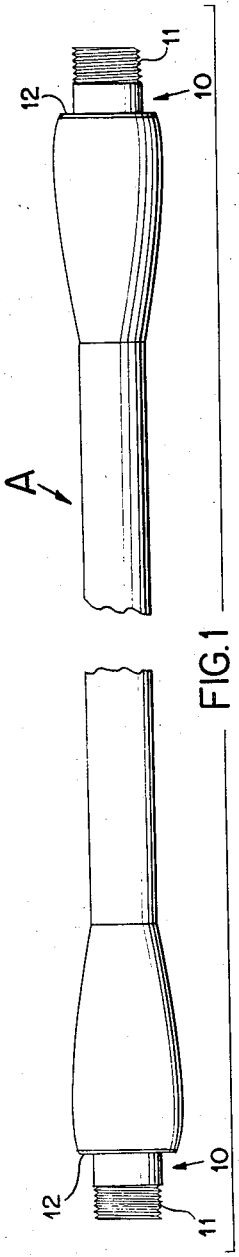
INVENTOR.
Ernest Schulthess
BY
ATTORNEYS

2,854,030
OIL HOSE

Ernest Schulthess, South Orange, N. J.

Application September 13, 1956, Serial No. 609,687

8 Claims. (Cl. 138—56)

This invention relates to an improved hose construction specially designed for the transference of oil under high pressure as in the loading of oil tankers, oil barges, etc.

Hose employed for the indicated purpose should be extremely strong in order to withstand the high pressures and the rough service encountered in the loading and discharge of oil to and from ships, etc. The importance of the capability of such hose to withstand this usage will be realized when it is understood that failure of such hose can result in loss of life and/or property damage of disaster proportions. In my patents, No. 1,810,032, dated June 16, 1931; No. 2,277,786, dated March 31, 1942; and No. 2,661,026, dated December 1, 1953, I have disclosed hose constructions which have been found in actual use to be highly desirable and effective for the transference of oil under high pressures. The primary purpose of the present invention is to provide an improved oil hose capable of withstanding substantially higher pressures and more service abuses than hose heretofore made, and at the same time be capable of a greater flexing radius than such prior known hose. This greater flexing capability of the improved hose is accomplished with far less strain on the fabric structure than ever was possible with prior known hose structures, a result, it is believed, which should give the hose of this invention a life of from 30 to 50% longer than those of prior hose.

The hose of the invention actually consists of a hose body and end nipples which are incorporated into the hose body during its construction and therefore constitute an integral part of the hose. A particular embodiment of this improved oil hose is illustrated in the accompanying drawings, in which Fig. 1 is a longitudinal broken view of a length of my improved hose; and Fig. 2 shows a segment of such hose in longitudinal section.

Fig. 3 is an enlarged detailed sectional view of an end portion of the anchoring wire in the hose structure.

In the drawings, the reference letter A designates generally the body of a length of hose constructed in accordance with the invention and provided at its ends with two nipples 10 permanently secured thereto in the manner hereafter described. As shown more clearly in Fig. 2 of the drawings, each of the nipples 10 includes a threaded end 11 which projects beyond a sealing cap 12. The cap 12 consists of an approximately ¼" thick disc made of a suitable rubber compound and mounted on its associated nipple between the threaded end 11 thereof and an outer bead 14 formed on the periphery of the nipple. The caps 12 seal the ends of the hose length A, preventing moisture or other injurious materials from penetrating into the anchorage structure of the hose and to a static wire 15, which is welded onto the nipple and is formed within the structure of the hose to take care of any static electricity which may develop while the hose is in actual service. As indicated in Fig. 2, this is accomplished by flexing the ends of the wires 15 into anchored position under the end coils of a coiled wire member 32 which extends the length of the hose and the purpose of which will be hereinafter described. Each nipple 10 also includes two spaced, external beads formed on the portion of the periphery thereof between the cap 12 and the inner end of such nipple. The inner bead 13 is located approximately 5 inches from the inner end of the nipple and the outer bead 14 is spaced from bead 13 a distance of approximately 4 inches and from cap 12 a distance of approximately 3 inches. The nipples 10 are machined and fully prepared for applying the ends of the hose length A permanently to the same. The inner ends of the nipples are preferably beveled, as indicated, to minimize possible damage to the hose during its flexure while in service.

In forming the hose section upon the two end nipples 10 there is first applied one ply of an open mesh fabric 16 such as "leno" fabric or "breaker" strip preferably coated on both sides with a suitable rubber compound. As shown in Fig. 2, the fabric ply 16 extends from a point located about two inches beyond the inner end of each nipple 10, outwardly over the first bead 13 of such nipple, the fabric ending at the base of the bead 13 on the outer side thereof. The fabric strip 16 protects the succeeding rubber tubing which is next applied to the nipples and which forms the inner lining of the hose structure, against any possible rupture thereof while the hose is being flexed in service. The fabric strip 16 also serves as a support for the ends of such rubber tubing in the region of the inner ends of the nipples, thus assuring a firmer anchorage of such tubing on the nipples. The rubber tubing forming the inner wall of the hose, is designated generally by the reference numeral 17 and is constituted of two layers of a suitable rubber compound each approximately $\frac{1}{16}$ of an inch thick. The first layer 17', of such tubing starts at the cap 12 of one nipple and extends throughout the entire length of the hose section to the cap 12 of the other nipple. The second layer 17" starts at the inner side of bead 13 on one nipple and continues throughout the length of the body of the hose between the nipples and to the inner side of the first bead 13 on the other nipple. Thus the rubber tube 17 is a laminated structure having a thickness of approximately $\frac{1}{8}$ of an inch thick throughout the major portion of the length of the line. It has been found that by making the tube 17 in this laminated form, its strength is substantially greater than a tube of one layer.

Over the rubber tube 17 there is applied one ply 19 of an open mesh fabric, such as "leno" fabric, provided on both sides with a skin coating of a suitable rubber compound, such as "neoprene." This fabric ply 19, like the tubing 17, extends throughout the entire length of the hose structure, from the cap 12 of one nipple to the cap 12 of the other nipple. This frictioned fabric forms a very strong bond between the tubing 17 and the overlying layers of canvas material in the body of the hose and, in the regions of the two nipples, between such tubing 17 and the two layers 20 of a suitable rubber composition such as "neoprene" associated with such nipples. The rubber layers 20 are each approximately 2 inches long and each extends from a point approximately one inch inwardly of the inner end of its associated nipple to a point approximately one inch outwardly from the inner end of each nipple. These layers 20 are approximately $\frac{1}{32}$ of an inch thick and act as cushions for the preceding and succeeding hose structures in the region of the inner ends of the nipples, permitting such structures of the hose to flex easily with a minimum of strain on the inner ends of such nipples and providing strong seals over the nipple ends.

The layers of canvas material designated generally by the reference numeral 21 and overlying the fabric strip 19 and the rubber layer 20, are applied in three parts, The first two plies 21', one of which is located at the end of the hose, each start about 6 inches beyond the inner end of an associated nipple and continues over the entire length of such nipple to its cap 12. The second two plies 21", one of which is also located at each end of the hose, each start approximately three inches beyond the inner end of the associated nipple and continues over the entire length of such nipple to the cap 12 thereof. These plies 21' and 21" are each made of special heavy duck material, such as 35 ounce hard duck and are frictioned on both sides. These duck plies provide a strong anchorage for the hose structure upon the nipple ends and greatly retard any possible shearing action which might otherwise result while the hose is working under continued heavy pressures. These duck plies 21' and 21" also retard possible sudden sharp bending of the hose structure at the inner ends of the nipples during the usage of the hose. Overlying the plies 21', 21" and spanning the length of the hose between the inner ends of such plies so that they extend the entire length of the hose between the caps 12, are two plies 21''' of a special 35 ounce hard woven flexible duck having its heavy warp threads extending longitudinally of the hose and being coated with a suitable rubber compound on both sides. The duck plies 21''' provide a perfectly balanced fabric structure that will permit constant maximum flexure under the high pressures to which the hose is subjected while it is in service without any danger of failure. This increased strength coupled with great flexure is enhanced by reason of the fact that the heavy warp threads of the duck plies 21''' extend longitudinally of the hose length. With such a structure the maximum strength of the duck is utilized against separation due to high pressures or flexure of the hose, while at the same time, a minimum of resistance against flexure is provided. As a result it has been found that this construction provides a hose that has a substantially greater flexing radius than hose constructed according to prior known methods, while being substantially stronger than the latter.

Spirally wound on the fabric structure 21 is a strip 22 of 35 ounce hard duck approximately 5½ inches wide. This spiral strip 22 provides substantially greater strength to the complete hose structure without retarding its flexibility. It has been found that this spirally wound strip will have the physical strength of two plies of 24 ounce regular hose duck and will afford substantially greater flexibility than the latter. The spirally wound strip 22, which extends throughout the entire length of the hose structure from one cap 12 to the other cap 12, is coated between the inner beads 13 of the nipples with a 1/16 inch thick layer 23 of a substantially soft rubber compound such as "neoprene." The rubber layer 23 provides a cushioned seat for a spirally wound member 24 and the plies 30 of heavy frictional duck material located between the coils of such member 24.

The member 24 is constituted of a sash rope having a diameter of either ¼ inch, 5/16 of an inch, or 3/8 of an inch, depending upon the structural requirements of the hose. The rope 24 is spirally wound on the rubber layer 23 so that its coils are uniformly spaced and extends from the inner bead 13 of one nipple, throughout the entire length of the hose body between such nipples, and to the inner bead 13 of the other nipple. The rope 24 is applied to the rubber layer 23 under such pressure that it becomes partially embedded in layer 23 squeezing the latter out so that only a thin layer of the rubber 23 lies between the rope 24 and the spiral strip 22. There is thus effected a firm seating of the rope 24 in the rubber layer 23. Preferably also the cord 24 is placed in a bath of rubber cement prior to its installation in the hose structure. The rubber cement coated and impregnated cord 24 thus becomes bonded to the rubber layer 23 and to the subsequently applied fabric which is placed in engagement therewith and becomes integral therewith to form a solid homogeneous hose structure. Between the coils of the rope 24, at the ends thereof, and from a distance approximately two inches from the inner ends of the nipples and extending to the inner beads 13 thereof, the spaces between such end coils are filled in with the spiral convolutions of two strips 25 of a friction fabric, such as duck. These filler strips 25 serve a threefold purpose. They serve to firmly anchor the ends of the rope 24 to the nipples in a manner which will render it unlikely that the ends of such rope shall ever loosen under any stresses or pressures that the hose might be subjected to in usage. The filler strips 25 also provide solid bases for the two anchoring wires 27 which are subsequently applied upon the hose structure over the nipples. The filler strips 25 also function to retard flexure of the hose structure at the inner ends of the nipples, thereby protecting the hose structure against failure during the bending stresses and high pressures to which it is subjected.

A single ply 26 of special hard duck frictioned on both sides is then wrapped over each end portion of the hose upon the material so far assembled in the formation of the hose structure. The ply 26 on each end of the hose extends inwardly from the cap 12 of an associated nipple, over the entire length of such nipple, and to a point approximately 8 inches beyond the inner end of such nipple. The two spaced plies 26 coact with the strips 25 to reinforce the hose structure in the regions of the inner ends of the nipples and to prevent sharp flexure of line in such regions. The plies 26 also cooperate with such convolutions and with the duck plies 21' and 21" to prevent shearing of the hose when it is subjected to sudden high pressures in such regions. Mounted upon the plies 26 within the lengths of their associated nipples are two closely wound anchoring wires, each starting approximately ¼ of an inch outwardly from the inner end of a nipple and extending approximately to the cap 12 thereof. During the application of these anchoring wires 27, a plurality of steel cleats 27' may be applied at the inner and outer ends of each wire to anchor it securely in position on its associated nipple and to make it impossible for the anchor wire to ever become loose or slip from its original anchorage during the use of the hose. The coils of the wires 27 are placed in position on the ends of the hose under heavy tension in order that the permanency of their position on the associated nipples is assured. It is preferable that a light coating 27" of a suitable rubber compound such as "neoprene" or, rubber cement is applied over the anchor wires 27 in order to enable the bonding of such wires to a subsequent covering sheet 28 of rubber composition. The covering sheet 28 is approximately 1/32 of an inch thick and provides a smooth surface which serves as a good base for the succeeding hose structure built over the anchor wires 27. Between the inner end of each anchor wire 27 and extending for a distance of approximately 2½ inches, starting approximately 2 inches beyond the inner ends of the associated nipples, are a plurality of layers 29 of duck arranged to form a tapered reinforcement against the inner end of the anchoring wires 27. This reinforcement 29 cooperates with the cleats 27' to prevent the anchor wire from becoming loose or slipping, and also adds strength to the complete hose structure in that it prevents the same from flexing too sharply at the ends of the nipples. In this latter respect, the reinforcement 29 cooperates with the fabric strip 25, the strips 17', 17" and the strip 16, to retard flexure of the hose in such regions of the nipples.

Overlying the rubber covering 28 upon the anchoring wires 27, the tapered duck reinforcement 29, the rope 24, and the portions of the rubber layer 23 between the convolutions of the rope 24 in the body of the hose between the nipples, are a plurality of plies 30 made of a special 35 ounce hard flexible duck material frictioned on both sides. It will be noted in Fig. 2 of the drawings, that the duck plies 30 are drawn over the convolutions of the sash rope 24 so that they maintain such rope embedded in the rubber layer 23, and between such convolutions engage with and press down upon such rubber layer 23 so that the rubber material of layer 23 is squeezed into the spaces around and over the convolutions of the rope 24 and such convolutions together with the plies 30 form a corrugated fabric structure. As a result of this structure the convolutions of the rope are so securely anchored that they will not loosen under any strains or pressures to which the hose may be subjected while in usage. It will also be noted, that the spirally shaped corrugation formed by the rope 24 and the duck material 30 provide an ideal seat for the subsequently applied spiral wire 32. These three elements it has been found, form a corrugated hose construction which has a far greater flexibility than any hose construction of which the applicant is aware and at the same time, is substantially stronger than any known prior hose construction. These advantages over prior hose structures are attained at no higher cost and prolong the service life of the hose from approximately 30 to 50%.

It will be noted from Fig. 2 of the drawings that the ends of the static wires 15 are bent down upon the outer ends of the plies 30 and each extend inwardly over its associated nipple to a point between the two beads 13, 14 on such nipple. The inner ends of the wires 15 are locked in place beyond the beads 14 and upon the duck plies 30 by the closely wound coils at the ends of spiral wire 32. Between the nipples 10, 10 and overlying the duck plies 30, is a 1/16 inch thick layer 31 of a suitable rubber composition such as "neoprene," which in this region provides a seal against any moisture, etc., penetrating into the layer 30, and also acts as a cushion for the wire 32. The wire 32 has in cross section a full oval shape and is spirally wound on the body of the hose so that its coils are located in the spiral depression formed in the duck plies 30 between the coils of the rope 24. The ends of the wire 32 extend over the inner ends of the nipples 10 and anchor the inner ends of the static wires 15 in the manner previously indicated. For hoses having inside diameters of from 3 to 5 inches, it has been found that a full oval wire having a ½ inch width and 7/32 of an inch diameter will be strong enough to withstand the stresses to which hose of such size are subjected. For hose having an inside diameter greater than 6 inches, it is preferable to use full oval wire of 5/8 of an inch width and ¼ of an inch in diameter. The oval wire 32 provides the greater part of the strength of the hose against bursting or compressive stresses and by reason of its oval construction operates with a rocker motion for the complete hose structure during the use of the hose, thereby greatly reducing the strains which are exerted on the fabric structure and prolonging the life of the hose. The closely wound coils at the ends of the oval wire 32 are cleated together, as indicated at 32′, so that they will be permanently positioned on the ends of the static wires 15. In the body of the hose between the inner ends of the nipples there is provided a filler layer 33 of rubber composition to provide a smooth even covering over the full oval wire in such region of the hose. On application this filler layer 33 becomes bonded to or integral with the cushion rubber layer 31.

Extending outwardly from over the ends of the rubber filler layer 33 and throughout the entire area of the nipples are filler fabrics 34. As indicated in the drawing, each filler fabric 34 is spirally covered over an end of filler layer 33, in the spaces between the open coils of the oval wire 32, over the anchoring end of such wire, and over the inner end of the hose structure so that the outer surface of the hose structure covered by such fabric 34 presents a smooth, even contour. A rubber layer 35 of a rubber composition approximately 1/32 of an inch thick is then applied over each filler fabric 34 to form a cushion for the latter and also to provide a cushion for subsequently applied reinforcement plies 37 of hard duck material on the ends of the hose structure. Prior to the application of the end duck plies 37, however, there is applied throughout the entire length of the hose a single ply 36 of special 35 ounce hard duck fabric, the surfaces of which have been previously provided with a rubber compound friction. This ply 36 extends from the cap 12 of one nipple throughout the entire length of the hose to the other nipple. The end plies 37 are preferably constituted of 22 ounce hard duck frictioned on both sides with a good friction compound and are applied on top of the single ply 36. The first ply of this material at each end of the hose starts 16 inches beyond the inner end of its associated nipple and continues outwardly over the nipple to the cap 12 thereof. The second ply of such material at each end of the hose extends from the associated cap 12 inwardly to a point a distance of approximately 8 inches beyond the inner end of the associated nipple.

A layer 38 of a rubber composition of good soft aging quality and high tensile strength, and of a thickness approximately 1/32 of an inch, is then applied over the entire structure of the hose extending from the cap of one nipple to the cap of the other nipple. Over the layer 38 is applied one layer 39 of an open mesh fabric, such as "leno" fabric having a friction compound applied to both sides. Layer 39, like layer 38, extends throughout the entire length of the hose and is sandwiched between layer 38 and a layer 40 of a suitable rubber composition approximately 3/32 of an inch. The integrally bonded three layers 38, 39 and 40 constitute the outer covering of the hose. Preferably also, layers 41 of heavy reinforcing fabric, such as 35 ounce hard duck, frictioned on both sides, is provided over the end portions of the hose covering the nipples to protect the ends of the hose. Plies 41 preferably extend from the caps 12 of the nipples to a point approximately 6 inches beyond the inner ends of such nipples. As will be noted from Fig. 2, even though the interior of the hose is provided with a tough, strong corrugated structure capable of high flexure and resistance to high stresses, the inner bore of the hose and the exterior surfaces thereof are smooth.

It will be seen from the foregoing description and the disclosure of the drawing, that the improved hose of this invention is produced from components combined so that the hose structure has greater strength and flexing radius than prior hose of this type, and so that any possible chafing and wear between such components under stress and flexure of the hose during usage will be at a minimum. In this connection it might be pointed out that the rope 24 in addition to possessing advantages of weight and flexibleness over a coiled steel wire, is an important factor in minimizing possible chafing and wear in the hose structure. Unlike a metal wire, the rope 24 becomes integral with the rubber and fabric of the hose structure so that the whole functions as one unified and unitary structure. As a result the rope 24 cannot cut or otherwise damage or affect the rubber or fabric structure, and cannot become loose during the flexure of the hose while in use. Also unlike a metal wire, it will not be affected by moisture, or become corroded or rusted. Thus, the bond between the rope 24 and the rubber and fabric structure will not deteriorate over long periods of time and usage.

While I have hereinabove described and illustrated a preferred embodiment of my invention, it will be apparent to those skilled in the art that various changes and modifications may be made without departing from the spirit of the invention, or the scope of the appended claims.

I claim:

1. In a construction of hose, the combination of, an inner lining composed of a material resistant to the fluid to be transferred in the hose and forming a continuous tubular passageway for such fluid, an interior body portion comprising a cord rope wound around said inner lining, the convolutions of which are substantially spaced from one another, a plurality of plies of duck material overlying said cord rope, the portions of said duck plies between the coils of said cord rope being depressed into the spaces between such cord coils so that said rope and duck plies form a corrugated structure, said corrugated fabric structure maintaining the coils of the rope anchored to the underlying hose structure on which it is wound during the use of the hose, a helix of wire wound on said plies of duck so that the coils thereof are located in the spiralling depression formed in said plies of duck by said cord rope, said helix of wire locking said corrugated fabric structure and said rope coils on the underlying hose structure against separation under the stresses incurred during the use of the hose, and filler material filling the spaces between the coils of said wire helix to provide a substantially plain surface, and substantially smooth covering material over said filler material.

2. In a construction of hose, the combination of, an inner lining composed of a material resistant to the fluid to be transferred in the hose and forming a continuous tubular passageway for such fluid, an interior body portion comprising a strip of duck spirally woven around said inner lining to provide an unbroken layer of the duck material, a layer of rubber composition overlying said spirally wound strip, a cord rope wound around and embedded in said rubber layer, the convolutions of said cord rope being substantially spaced from one another and bonded in such spaced relation to said rubber layer, a plurality of plies of duck material overlying said cord rope, the portions of said duck plies between the coils of said cord rope being depressed into the spaces between such cord coils so that said rope and duck plies form a corrugated structure on said rubber layer, said corrugated fabric structure being bonded to said rope and maintaining the latter anchored in bonded relation to said rubber layer during the use of the hose, a helix of wire wound on said plies of duck so that the coils thereof are located in the spiralling depression formed in said plies of duck by said cord rope, said helix of wire locking said corrugated fabric structure and said rope coils on said rubber layer against separation under the stresses incurred during the use of the hose, and filler material filling the spaces between the coils of said wire helix to provide a substantially plain surface, and substantially smooth covering material over said filler material.

3. A hose length comprising a hose body having a nipple permanently connected to one end thereof, said nipple having a plurality of spaced annular beads provided on the outer surface thereof and adjacently spaced from the inner end of said nipple, a seal cap located on said nipple outwardly of said beads and sealing the adjacent end of said hose body, said hose body including an inner lining composed of material resistant to the fluid to be transferred in the hose and forming a continuous tubular passageway extending from the inner end of said nipple, duck material surrounding said inner lining and extending the entire length of the hose body, a cord rope wound around said duck material, the convolutions of which are spaced from one another and which extend outwardly over said nipple, a spirally wound filler located in the spaces between the coils of the rope overlying said nipple, a plurality of plies of duck material overlying said cord rope and in the region of said nipple overlying the cord rope and said spiral filler, the portions of said duck plies beyond the nipple and between the coils of said cord rope being depressed into the spaces between such cord coils so that said rope and duck plies form a corrugated structure beyond the nipple, a helix of wire wound on said plies of duck so that the coils thereof are located in the spiralling depression formed in said plies of duck by said cord rope, the coils of said wire helix extending over the non-corrugated portion of said duck plies overlying said nipple, a rubber composition filling the spaces between the coils of said wire helix beyond the nipple, and fabric filler material filling the spaces between the coils of said wire helix in the region of said nipple, and substantially smooth covering material over said rubber and fabric filler material.

4. A hose length comprising a hose body having a nipple permanently connected to one end thereof, said nipple having a plurality of spaced annular beads provided on the outer surface thereof and adjacently spaced from the inner end of said nipple, a seal cap located on said nipple outwardly of said beads and sealing the adjacent end of said hose body, said hose body including an inner lining composed of material resistant to the fluid to be transferred in the hose and forming a continuous tubular passageway extending from the inner end of said nipple, said lining material extending over the exterior surface of said nipple to said seal cap, duck material surrounding said inner lining and extending the entire length of the hose body, a cord rope wound around said duck material, the convolutions of which are spaced from one another and which extend outwardly over said nipple, a spirally wound filler located in the spaces between the coils of the rope overlying said nipple, an anchoring wire wholly contained within the region of said nipple and securing the outer end of said rope cord and said spiral filler to said nipple, a plurality of plies of duck material overlying said cord rope and in the region of said nipple overlying said cord rope, said spiral filler and said anchoring wire, the portions of said duck plies beyond the nipple and between the coils of said cord rope being depressed into the spaces between such cord coils so that said rope and duck plies form a corrugated structure beyond the nipple, a static wire secured at one end to the exterior surface of said nipple, extending outwardly around the outer end of the hose structure and being bent over said duck plies, a helix of wire wound on said plies of duck so that the coils thereof are located in the spiralling depression formed in said plies of duck by said cord rope, the coils of said wire helix extending over the non-corrugated portion of said duck plies overlying said nipple and locking the outer end of said static wire against said duck plies, a rubber composition filling the spaces between the coils of said wire helix beyond the nipple, and fabric filler material filling the spaces between the coils of said wire helix in the region of said nipple, and substantially smooth covering material over said rubber and fabric filler material.

5. A hose length such as defined in claim 3, in which said inner lining is constituted of rubber material and open mesh fabric embedded in said rubber material, said open mesh fabric extending from a point adjacently spaced inwardly beyond the inner end of said nipple, outwardly over the inner end of said nipple to the inner annular bead thereof, and said rubber material extending outwardly over said nipple and past the outer end of said open mesh fabric to said seal cap, the thickness of said rubber material, from the inner end of said nipple outwardly to said inner annular bead, being substantially greater than the thickness of such material outwardly beyond said inner annular bead.

6. A hose length such as defined in claim 3, in which said inner lining is composed of rubber material and extends outwardly over said nipple, and includes a cushioning layer of rubber overlying said rubber lining and extending from a point adjacently spaced inwardly beyond the inner end of said nipple to a point adjacently spaced outwardly from such inner end of the nipple, and a ply of open mesh fabric provided with rubber on both sides thereof and extending the entire length of said hose body, said rubber coated fabric ply being located between said rubber inner lining and said duck material surrounding said inner lining, and in the region between said points, being located between said inner lining and said cushioning layer, said rubber coated fabric ply bonding said inner lining to said duck material and cushioning layer.

7. A hose length such as defined in claim 3, in which said duck material surrounding said inner lining is composed of an inner ply which extends outwardly from a point spaced inwardly beyond the inner end of said nipple and over said nipple to said seal cap, a second ply overlying said first ply and extending from a point located between the starting point of said first ply and the inner end of said nipple, outwardly over said nipple to said seal cap, and a third ply overlying said first and second plies and extending the entire length of said hose body.

8. A hose length such as defined in claim 3, including a layer of rubber composition positioned between said duck material surrounding said inner lining and said cord rope, and in which said cord rope is partially embedded in and bonded to said layer of rubber composition, said plurality of plies of duck material overlying said cord rope being bonded to such rope and maintaining the latter anchored in embedded, bonded relation to said rubber layer during the use of the hose, and said helix of wire locking said plies of duck, said rope and said rubber layer together in said bonded relation and against separation under the stresses incurred during the use of the hose.

References Cited in the file of this patent

UNITED STATES PATENTS

| | | |
|---|---|---|
| 334,233 | Jones | Jan. 12, 1886 |
| 1,810,032 | Schulthess | June 16, 1931 |
| 1,911,570 | Holstein | May 30, 1933 |
| 1,980,466 | Angeja | Nov. 13, 1934 |
| 2,219,047 | Maclachlan | Oct. 22, 1940 |
| 2,661,026 | Schulthess | Dec. 1, 1953 |